US012638370B2

(12) United States Patent　(10) Patent No.:　US 12,638,370 B2
Okano et al.　(45) Date of Patent:　May 26, 2026

(54) SAMPLE CONTAINER AND DYNAMIC MECHANICAL ANALYZER USING THE SAME

(71) Applicant: HITACHI HIGH-TECH ANALYSIS CORPORATION, Tokyo (JP)

(72) Inventors: Yui Okano, Tokyo (JP); Nobuaki Okubo, Tokyo (JP)

(73) Assignee: HITACHI HIGH-TECH ANALYSIS CORPORATION, Tokyo (JP)

( * ) Notice: Subject to any disclaimer, the term of this patent is extended or adjusted under 35 U.S.C. 154(b) by 103 days.

(21) Appl. No.: 18/199,301

(22) Filed: May 18, 2023

(65) Prior Publication Data

US 2024/0019349 A1　Jan. 18, 2024

(30) Foreign Application Priority Data

Jul. 16, 2022　(JP) ................................. 2022-114414

(51) Int. Cl.
　*G01N 11/16*　(2006.01)
(52) U.S. Cl.
　CPC .................................... *G01N 11/16* (2013.01)
(58) Field of Classification Search
　CPC ... G01N 11/16; G01N 2011/002; B01F 21/02;
　　　　　B01F 23/43; B01F 23/53; B01F 31/44
　USPC ......... 73/54.24–54.36, 54.41, 863, 426–429;
　　　　　422/547–558; 366/31, 140, 147,
　　　　　366/241–260, 108, 114, 120, 122
　See application file for complete search history.

(56) References Cited

U.S. PATENT DOCUMENTS

| 3,107,537 | A | * | 10/1963 | Isreeli | ................... | B01F 33/841 |
| | | | | | | 73/864.24 |
| 4,151,252 | A | * | 4/1979 | Marchand | .......... | G01N 25/4866 |
| | | | | | | 422/51 |
| 2018/0149563 | A1* | | 5/2018 | Takada | ..................... | G01N 1/28 |

FOREIGN PATENT DOCUMENTS

| ES | 2856340 | T3 | * | 9/2021 | ......... A61B 10/0038 |
| JP | H0743288 | A | * | 2/1995 | |
| JP | 2003215135 | A | * | 7/2003 | |
| JP | 2012181048 | B1 | | 9/2012 | |
| WO | 2017121555 | | * | 7/2017 | |

* cited by examiner

*Primary Examiner* — Robert R Raevis
(74) *Attorney, Agent, or Firm* — Holland & Hart LLP

(57)　　　　ABSTRACT

In measuring dynamic viscoelasticity, a problem that a viscous fluid sample such as polymer melt index, thermosetting resin, adhesive, or paint cannot be measured for dynamic viscoelasticity can be solved. Disclosed is a sample container 1 used to measure dynamic viscoelasticity according to temperature changes occurring when heating or cooling a sample. The sample container 1 includes a lower-end-closed sample cup with an opening at an upper end, and an insertion jig 5 having a cross section smaller in area than the opening of the sample cup 2, being insertable into the sample cup 2 through the opening, and being capable of transferring vibration to a sample contained in the sample cup 2.

5 Claims, 4 Drawing Sheets

SAMPLE CONTAINER AND DYNAMIC MECHANICAL ANALYZER USING THE SAME

CROSS REFERENCE TO RELATED APPLICATION

The present application claims priority to Japanese Patent Application No. 2022-114414, filed Jul. 16, 2022, the entire contents of which is incorporated herein for all purposes by this reference.

BACKGROUND OF THE INVENTION

1. Field of the Invention

The present invention relates to a sample container used for physical thermal analysis of a sample while heating or cooling the sample and to a dynamic elasticity measuring device using the same.

2. Description of the Related Art

Conventionally, as a method of evaluating the temperature characteristics of a sample, a method called thermal analysis has been used in which the sample is heated or cooled and temperature-dependent the physical changes of the sample are measured. Thermal analysis is defined in JISK0129: 2005 standard "General Rules for Thermal Analysis", and all methods of measuring the physical properties of a sample while controlling the temperature of a measurement target (sample) in a programmed manner are considered thermal analysis. One of the commonly used thermal analysis methods is dynamic mechanical analysis (DMA).

Dynamic mechanical analysis (DMA) is a method of measuring the mechanical properties of a sample by exposing the sample to strain or stress that varies over time in the sample and then measuring the internal stress or strain generated in the sample. Considering dynamic mechanical analysis (DMA) as one of thermal analysis methods, the DMA can be interpreted as a technique of measuring the mechanical properties of a sample according to vibration load (or strain) as a function of temperature.

Patent Literature 1 discloses a dynamic mechanical analyzer in which details are provided to a part of an elastic arm that holds both ends of a solid sample such as rubber, plastic, or a composite material to facilitate deformation against the thermal expansion of the solid sample. With this structure, unfavorable shape changes such as buckling that occur when the sample thermally expands can be effectively removed, and stiffness required to withstand the load of the sample can be maintained. Therefore, the dynamic mechanical analyzer has improved measurement accuracy for solid samples such as rubber, plastic materials, and composite materials.

LITERATURE OF RELATED ART

Patent Literature

[Patent Literature 1] Japanese Patent Application Publication No. 2012-181048

SUMMARY OF THE INVENTION

Conventionally, solid samples such as rubber, plastic materials, and composite materials can be measured for dynamic viscoelasticity, but there is a problem that viscous fluid samples such as polymer melt viscosity, thermosetting resins, adhesives, and paints cannot be measured for dynamic viscoelasticity because such viscous fluid samples cannot be retained (fixed).

The present invention has been made in view of the above-mentioned problems, and one objective of the present invention is to provide a sample container that enables stable dynamic viscoelasticity measurement of viscous fluid samples such as polymer melt viscosity, thermosetting resins, adhesives, and paints. Another objective of the present invention is to provide a dynamic mechanical analyzer using the same.

The present invention employs a construction described below to solve the aforementioned problems. In other words, a sample container according to a first invention is a sample container for measurement of dynamic viscoelasticity according to temperature changes caused by heating or cooling a sample. The sample container includes: a sample cup having a lower-end-closed tubular shape having an opening an opening at an upper end; and an insertion jig having a cross section smaller in area than the opening of the sample cup, being insertable into the sample cup through the opening, and being capable of transferring vibration to a sample contained in the sample cup.

Since the sample container is equipped with the insertion jig having a cross-section smaller in area than the opening of the sample cup, being insertable into the sample cup through the opening, and being capable of transferring vibration to the sample contained in the sample cup, by inserting the insertion jig of the sample container for dynamic viscoelasticity measurement into the sample contained in the sample cup and transferring vibration to the sample, even a viscous fluid sample such as polymer melt viscosity, a thermosetting resin, an adhesive, a paint binder, or a paint can be measured for dynamic viscoelasticity.

A sample container according to a second invention is characterized in that in the first invention, the sample container is made of aluminum, gold, silver, copper, or platinum.

In other words, since the sample container is made of aluminum, gold, silver, copper, or platinum, that is, the sample container is made of a material with high thermal conductivity, it is possible to efficiently heat or cool the sample and to improve measurement accuracy.

A sample container according to a third invention is characterized in that, in the first invention, the sample cup includes: a lower-end-closed sample cup main body having openings in an upper portion and a side portion; and a sample cup side portion that is removably fixed to the sample cup main body in a manner to block the opening in the side portion of the sample cup main body.

In other words, since the sample cup of the sample container is composed of the lower-end-closed sample cup main body having the openings in the upper portion and the side portion and the sample cup side portion that is removably fixed to the sample cup main body in a manner to block the opening in the side portion of the sample cup main body, the sample cup side portion can be removed from the sample cup main body after the measurement is completed. As a result, the side portion of the sample cup main body is opened, the sample in the sample cup can be easily washed off and thus the sample container can be reused.

A sample container according to a fourth invention is characterized in that in the first invention, a leading end portion of the insertion jig is sharpened toward the outermost end point of the insertion jig.

In other words, since the leading end portion of the insertion jig of the sample container is sharpened toward the outermost end point, the insertion jig can be easily inserted into a relatively high viscosity sample such as an adhesive. Therefore, measurement can be easily performed, and compressive deformation of the sample that may occur when the insertion jig is inserted into the lower-end-closed sample cup can be prevented.

A sample container according to a fifth invention is characterized in that, in the first invention, a sample cup holding rod protruding downward from a lower surface of the sample cup is additionally included.

In other words, since the sample cup holding rod protruding downward is provided on the lower surface of the sample cup of the sample container, the sample cup can be easily and firmly fixed to a dynamic mechanical analyzer by gripping the sample cup holding rod.

A sample container according to a sixth invention is characterized in that, in the fifth invention, the sample cup and the sample cup holding rod may be integrally formed. In other words, in the sample container, since the sample cup and the sample cup holding rod are integrally formed as a single object, screws or clearances are not required, and thus the thermal conductivity of the sample container can be improved.

A dynamic mechanical analyzer according to a seventh invention includes: the sample container of any of the first to sixth inventions and a temperature varying unit that heats or cools the sample container. The dynamic mechanical analyzer thereby measures dynamic viscoelasticity.

That is, since the dynamic mechanical analyzer includes the sample container of any of the first to sixth inventions, a viscous fluid sample such as polymer melt viscosity, thermosetting resin, adhesive, paint binder, paint, and the like can be measured for dynamic viscoelasticity.

According to the present inventions, the effects described below can be obtained.

That is, according to the sample containers and the dynamic mechanical analyzer according to the inventions, since the insertion jig is included which has a cross-section smaller in area than the opening of the sample cup, can be inserted into the sample cup through the opening, and can transfer vibration to the sample in the sample cup, even a viscous fluid sample such as polymer melt viscosity, thermosetting resin, adhesive, point binder, and paint can be measured for dynamic viscoelasticity.

BRIEF DESCRIPTION OF THE DRAWINGS

FIG. 3A to FIG. 3C are three-sided view illustrating a sample container excluding an insertion jig, according to a second embodiment of the present invention;

DESCRIPTION OF THE PREFERRED EMBODIMENTS

Hereinafter, a sample container and a dynamic mechanical analyzer including the same, according to the present invention, will be described with reference to FIGS. 1 and 2.

Figure 1:
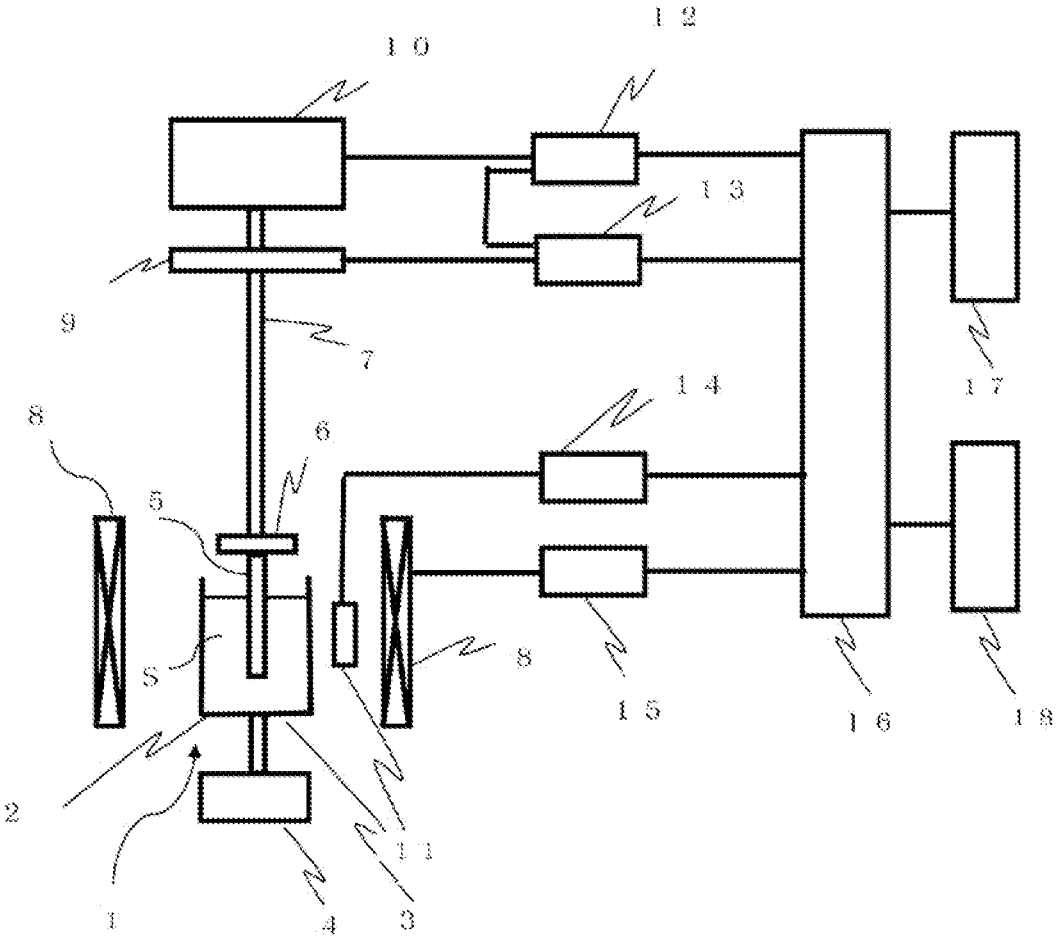
FIG. 1 is a schematic view illustrating the construction of a dynamic mechanical analyzer according to a first embodiment of the present invention.

FIG. 1 is a schematic view illustrating the construction of a dynamic mechanical analyzer according to a first embodiment of the present invention.

Figures 2A, 2B, 2C:
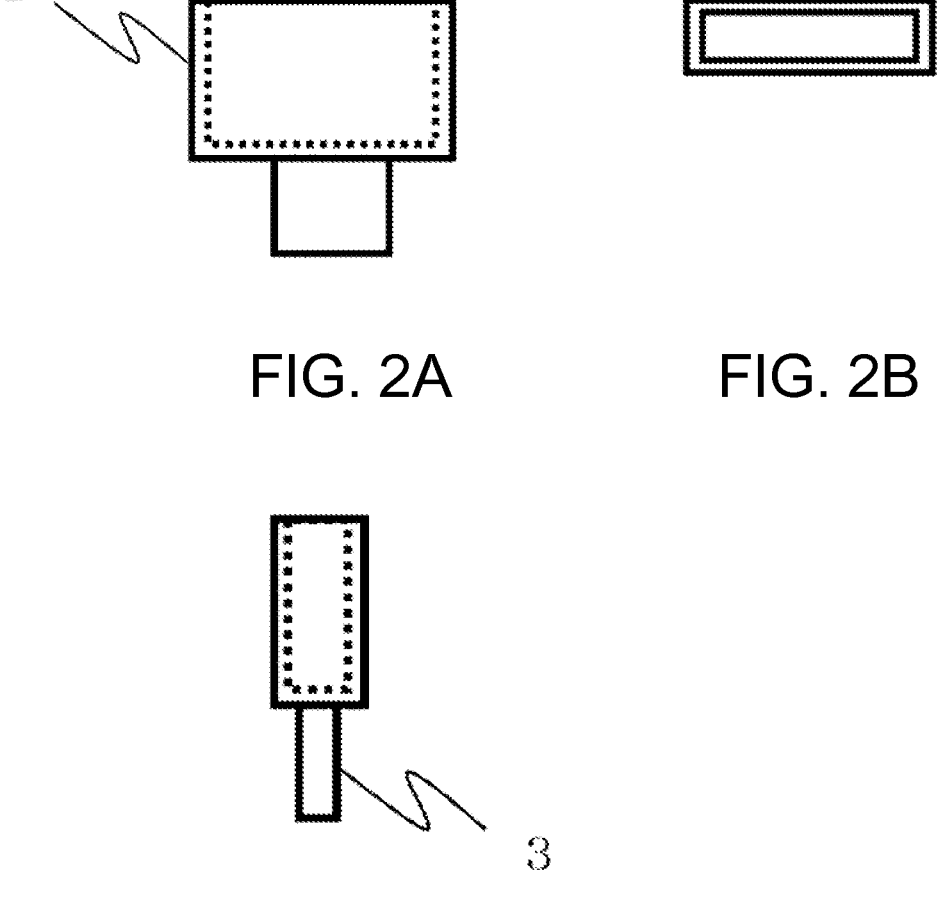
FIG. 2A to FIG. 2C are three-sided view illustrating a sample container excluding an insertion jig, according to the first embodiment of the present invention.

FIG. 2A is a three-sided view illustrating a sample container 1 excluding an insertion jig 5, according to the first embodiment of the present invention. FIG. 2A is a front view, FIG. 2B is a top view, and FIG. 2C is a side view.

The dynamic mechanical analyzer (DMA) according to the present embodiment has the same structure as a conventional dynamic mechanical analyzer, except that the dynamic mechanical analyzer according to the present embodiment uses a sample container 1 for containing a viscous fluid sample such as a polymer melt viscosity, a thermosetting resin, an adhesive, a paint, or the like. Therefore, an outline thereof will be described.

The dynamic mechanical analyzer (DMA) according to the present embodiment is constructed as described below.

The sample container 1 is a sample container for measurement of dynamic viscoelasticity of a sample S according to temperature changes caused by heating or cooling the sample S. The sample container 1 includes: a sample cup 2 having a lower-end-closed tubular shape with an opening at an upper end; and an insertion jig 5 having a cross section smaller in area than the opening of the sample cup 2, being insertable into the sample cup 2 through the opening, and being capable of transferring vibration to the sample S contained in the sample cup 2.

Note that the cross-sectional area of the insertion jig 5 is the maximum cross-sectional area of the portion to be inserted into the sample cup 2.

In addition, the sample container 1 further includes a sample cup holding rod 3 protruding downward from a lower surface of the sample cup 2.

In other words, the sample container 1 is composed of the sample cup 2 having a lower-end-closed tubular shape with an opening at an upper end and containing the sample S, the sample cup holding rod 3 for gripping the sample cup 2, and the insertion jig 5 having a columnar shape or a flat plate shape. Note that the present embodiment employs a columnar insertion jig 5.

The sample container 1 is made of aluminum, gold, silver, copper, or platinum.

In addition, the sample cup 2 and the sample cup holding rod 3 are provided as an integrated single body. In other words, the sample cup 2 and the sample cup holding rod 3 are integrally molded and formed of aluminum, gold, silver, copper, or platinum.

For example, the sample cup 2 and the sample cup holding rod 3 of the sample container 1 are provided as an integrated body by machining, injection molding, or press processing. For this reason, the sample cup and sample cup holding rod can be manufactured at a relatively low cost, and thus the sample cup and the sample cop holding rod can be provided as disposable forms. Since disposable use eliminates a washing process for the preparation for the next measurement, a total measurement time can be reduced. In addition, even in the case of a sample S that will be completely cured after measurement, which makes the sample container not reusable after the measurement, if the sample container 1 is a disposable sample container to be disposed of after a single use, the measurement of the sample S can be performed.

In addition, a lower portion of the sample cup holding rod 3 is fixed to a sample cup gripping chuck 4 with a screw or the like.

The dynamic mechanical analyzer (DMA) according to the present embodiment includes: a temperature varying unit 8 provided around the sample container 1 and configured to heat or cool the sample container 1 using a heater or coolant gas such as liquid nitrogen; a heating furnace controller 15 that controls the temperature varying unit 8; a temperature sensor 11 that detects a temperature; a temperature measuring instrument 14 that measures the detected temperature; an AC power controller 12 that controls AC power; a vibration generator 10 that generates the AC power controlled by the AC power controller; a probe 7 connected to the vibration generator 10, and an insertion jig gripping chuck 6 that is installed at a second end of the probe 7 and fixes the insertion jig 5 of the sample container 1 using a screw or the like.

The probe 7 transmits the amplitude generated by the vibration generator 10 to the insertion jig 5 to be inserted into the sample S via the insertion jig gripping chuck 6. A second end of the sample cup holding rod 3 holding the sample cup 2 is fixed to a sample cup gripping chuck 4 fixed to the casing of the dynamic mechanical analyzer (DMA) (not illustrated).

In addition, the dynamic mechanical analyzer (DMA) according to the present embodiment includes: a displacement detector 9 fixed to a part of the probe 7 and configured to read the amplitude transmitted to the probe 7 from the insertion jig 5 via the insertion jig gripping chuck 6; a calculator 13 that calculates a displacement detected by the displacement detector 9; a computer 16 that computes information sent from the calculator 13 and the temperature measuring instrument 14 and feeds a computation result back to the AC power controller 12 and the heating furnace controller 15; a measurement setting value input device 17 used to input frequency, amplitude and temperature; and a physical quantity output device 18 including a display to display storage elastic modulus, loss elastic modulus, and tan δ.

The outline of the dynamic viscoelasticity measurement procedure of the present invention will be described below.

First, the sample S is placed in the lower-end-closed tubular sample cup 2, the second end of the sample cup holding rod 3 integrated with the sample cup 2 is fixed to the casing of the dynamic mechanical analyzer (DMA) (not illustrated), the insertion jig 5 is inserted into the sample S through the opening while avoiding contact with the sample cup 2, and the second end opposite to the side of the sample S is fixed to the insertion jig gripping chuck 6.

Next, the sample container 1 is heated using the temperature varying unit 8 equipped with a heater while the temperature is detected by the temperature measuring instrument 14, so that a temperature elevation rate per a unit time is controlled to be constant.

An AC signal is input from the AC controller 12 to the vibration generator 10, and the vibration generator 10 generates amplitude (vibration) according to the AC signal transmitted from the AC controller 12 and applies the generated amplitude (vibration) to the probe 7. Thereby, the insertion jig 5 is vibrated through the insertion jig gripping chuck 6 provided at the second end of the probe 7.

In this case, since the insertion jig 5 is inserted into the sample S, strain with time delay caused by deformation of the sample S due to the vibration of the insertion jig 5 is detected by the displacement detector 9 via the insertion jig 5 and the probe 7. In addition, the amount of deformation caused by the frequency set in the computer 16 is taken into the calculator 13 and the amount of strain is obtained from the amount of deformation. Calculation is performed in the calculator 13 on the basis of the sinusoidal load and the amount of strain generated by the AC power controller 12. Storage modulus and/or loss modulus, tan δ, etc. are output as physical quantities to the physical quantity output unit 18 through the computer 16.

The amount of strain obtained by the calculator 13 is obtained as an amplitude value in the computer 16 and fed back through the AC power controller 12. In addition, control is performed such that the amount of strain that is obtained becomes equal to the amplitude value that is set.

At the same time, the temperature condition set in the computer 16 is controlled as a signal sent from the heating furnace controller 15 to the temperature varying unit 8 so that the temperature of the temperature varying unit 8 can be changed. Thereby, the temperature around the sample is changed. In this way, temperature-dependent physical quantities such as storage modulus, loss modulus, tan δ, etc. can be obtained.

In the dynamic viscoelasticity measurement procedure described above, the sample container 1 is heated with a heater. Alternatively, the sample container 1 may be cooled by installing a pipeline for flowing coolant gas such as liquid nitrogen in the temperature varying unit 8.

Hereinafter, a sample container and a dynamic viscoelasticity measurement using the same according to each of second to fourth embodiments of the present invention will be described with reference to FIGS. 3 to 5. In addition, through the description of each of the embodiments, the same constituent elements as those described in the first embodiment are denoted by the same reference numerals, a redundant description will not be given.

Figure 3C:
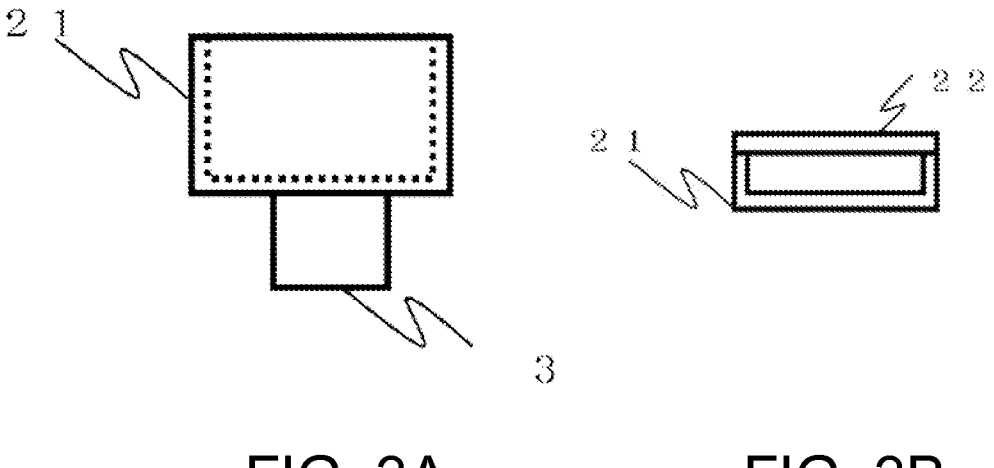
Figure 3C:
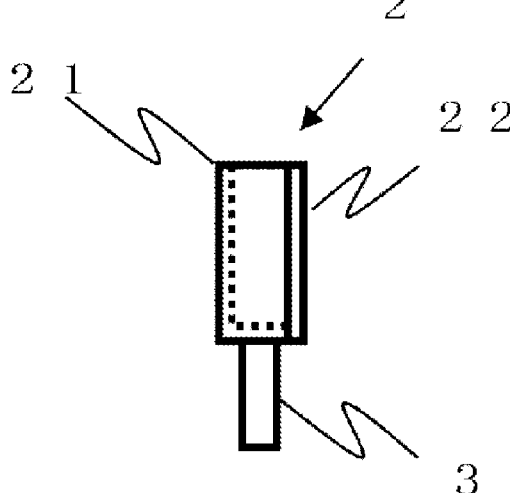

The difference between the second embodiment and the first embodiment is that in the first embodiment, the sample cup 2 is a lower-end-closed square tube-shaped integral body, whereas in the second embodiment, the sample container is configured such that as illustrated in FIG. 3A to FIG. 3C, the sample cup 2 is composed of a lower-end-closed sample cup main body 21 having openings in an upper portion and a side portion and a sample cup side portion 22 removably fixed to the sample cup main body in a manner to block the side opening of the sample cup main body 21.

That is, the sample cup main body 21 has a U-shaped transverse cross section and an L-shaped longitudinal cross section. When the sample cup side portion 22 is tightly attached to block the side opening, the sample cup becomes a lower-end-closed square tubular sample cup.

FIG. 3A to FIG. 3C are three-sided view illustrating the sample container 1 excluding the insertion jig according to the second embodiment of the present invention. FIG. 3A is a front view, FIG. 3B is a top view, and FIG. 3C is a side view.

As described above, the sample cup 2 in the present embodiment is composed of the sample cup main body 21 and the sample cup side portion 22 so that a side portion of the lower-end-closed tubular sample cup for storing the sample S can be opened. The sample cup main body 21 and the sample cup side portion 22 can contain the sample S when they are combined to form a tubular shape using a screw or the like (not shown). Due to this construction, when the screw or the like is removed after measurement, the sample S in the lower-end-closed tube can be easily washed off and thus the sample container can be reused.

Figures 4A, 4B, 5A, 5B:
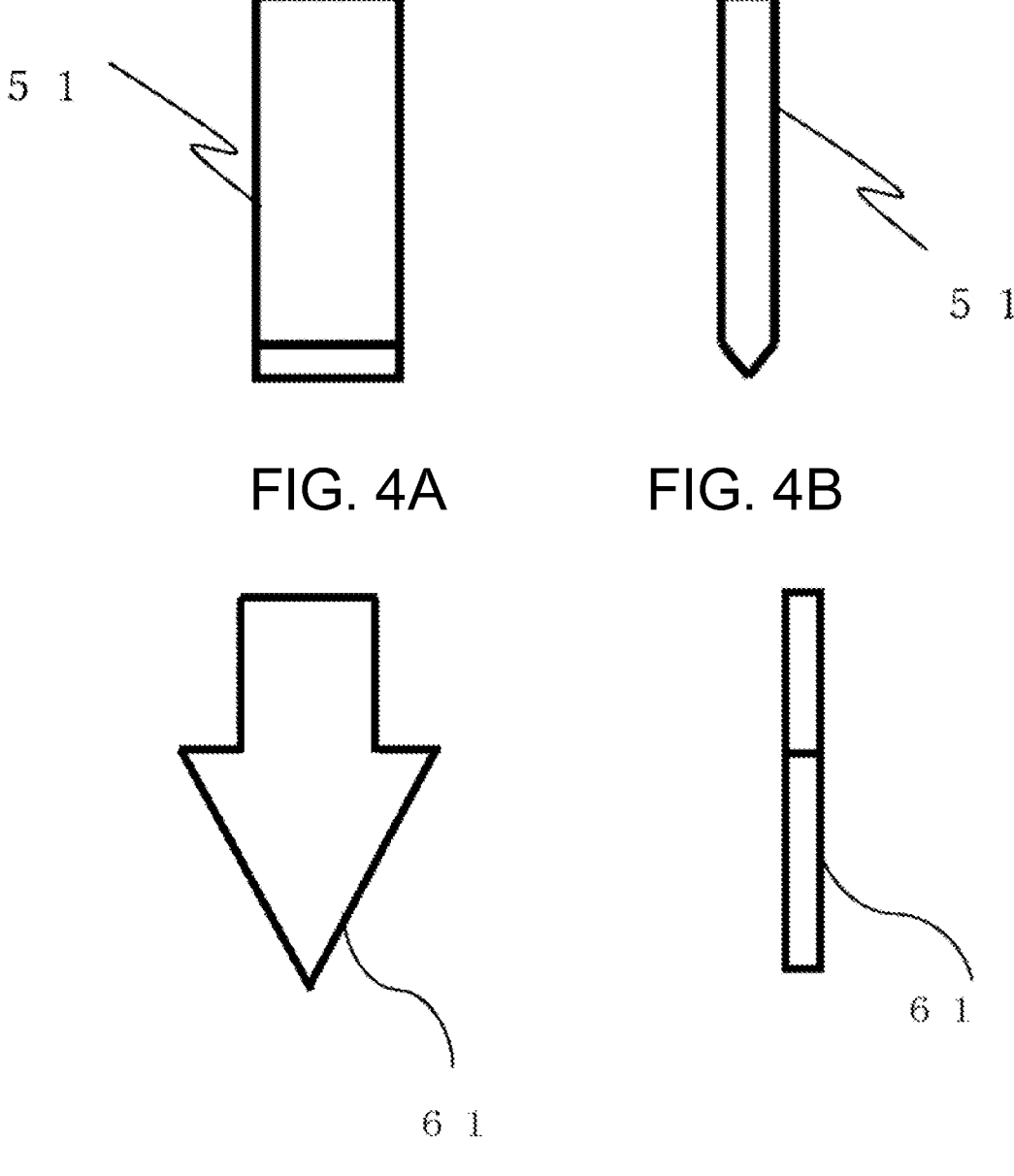
FIG. 4A and FIG. 4B are three-sided view illustrating an insertion jig according to a third embodiment of the present invention.
FIG. 5A and FIG. 5B are three-sided view illustrating an insertion jig according to a fourth embodiment of the present invention.

The difference between the third embodiment and the first embodiment is that, in the first embodiment, the insertion jig 5 has a columnar shape and a leading end (lower end) thereof has a rectangular longitudinal cross section, whereas in the case of the sample container of the third embodiment, as illustrated in FIG. 4A and FIG. 4B, an insertion jig 51 has a long plate shape, and a leading end portion (lower end portion) of the insertion jig 51 is sharpened toward the outermost end point.

FIG. 4A and FIG. 4B are front view of the insertion jig 51 of the sample container according to the third embodiment of the present invention. FIG. 4A is a front view, and FIG. 4B is a side view.

As described above, in the insertion jig 51 in the present embodiment, the leading end portion is sharpened. That is, the leading end portion of the insertion jig 51 is formed in a manner that the thickness thereof is gradually decreased toward the outermost end point. Since the leading end portion of the insertion jig 51 is sharpened, the insertion jig can be easily inserted into a relatively high viscosity sample such as an adhesive, so that measurement can be easily performed, and compressive deformation of the sample that may occur when the insertion jig 51 is inserted into a lower-end-closed sample cup can be prevented.

The difference between the fourth embodiment and the third embodiment is that, in the third embodiment, the leading end portion of the insertion jig 51 is sharpened such that the thickness is gradually decreased toward the outermost end point, whereas in the case of the sample container of the fourth embodiment, as illustrated in FIG. 5A and FIG. 5B, the leading end portion of an insertion jig 61 having a long plate shape is sharpened in a manner that the width of the leading end portion is gradually decreased toward the outermost end point.

FIG. 5A and FIG. 5B are front view of the insertion jig 61 of the sample container according to the fourth embodiment of the present invention. FIG. 5A is a front view, and FIG. 5B is a side view.

The insertion jig 61 in the present embodiment has a leading end portion shaped like an arrow pointing downward. Since the leading end portion is sharp, the insertion jig can be easily inserted into a relatively high viscosity sample S such as an adhesive, so that measurement can be easily performed. In addition, since the compressive force generated between the lower surface of the sample cup 2 and the insertion jig 61 can be distributed to the surroundings, the measurement accuracy can be improved.

Note that the technical scope of the present invention is not limited to the above-described embodiments, and various changes to the embodiments can be made without departing from the scope of the spirit of the present invention.

What is claimed is:

1. A dynamic mechanical analyzer for measurement of dynamic viscoelasticity according to temperature changes caused when heating or cooling a sample comprising:
   a sample cup with a lower-end-closed tubular shape with an opening at an upper end;
   an insertion jig having a cross section smaller in area than the opening of the sample cup, being insertable into the sample cup through the opening, and being capable of transferring vibration to the sample contained in the sample cup;
   a temperature varying unit configured to heat or cool the sample cup, the dynamic mechanical analyzer having a function of measuring the dynamic viscoelasticity; and
   a sample cup holding rod protruding downward from a lower surface of the sample cup.

2. The dynamic mechanical analyzer of claim 1, wherein the sample cup is made of aluminum, gold, silver, copper, or platinum.

3. The dynamic mechanical analyzer of claim 1, wherein the sample cup comprises:
   a lower-end-closed sample cup main body having openings in an upper portion and a side portion; and
   a sample cup side portion that is removably fixed in a manner to block the opening in the side portion of the lower-end-closed sample cup main body.

4. The dynamic mechanical analyzer of claim 1, wherein a leading end portion of the insertion jig is sharpened toward an outermost end point of the insertion jig.

5. The dynamic mechanical analyzer of claim 1, wherein the sample cup and the sample cup holding rod are integrally formed.

* * * * *